United States Patent [19]

Bienvenu et al.

[11] 4,180,408

[45] Dec. 25, 1979

[54] POLYVALENT METAL SALTS OF OXIDIZED AND AMIDIFIED WAXES

[75] Inventors: Joseph O. Bienvenu; Ashvinkumar N. Jagtap, both of Longview, Tex.

[73] Assignee: Petrolite Corporation, St. Louis, Mo.

[21] Appl. No.: 875,358

[22] Filed: Feb. 6, 1978

[51] Int. Cl.$^2$ .................. C09D 11/12; C09D 11/06
[52] U.S. Cl. .................................. 106/31; 106/270; 208/27
[58] Field of Search .................. 106/31, 23, 33

[56] References Cited

U.S. PATENT DOCUMENTS

| | | | |
|---|---|---|---|
| 2,890,124 | 6/1959 | Mange | 106/23 |
| 3,163,548 | 12/1964 | Stark | 106/23 |
| 3,994,737 | 1/1976 | Bienvenu | 106/272 |
| 4,004,932 | 1/1977 | Bienvenu | 106/270 |

FOREIGN PATENT DOCUMENTS 786654 11/1957 United Kingdom.
1224440 3/1971 United Kingdom.

Primary Examiner—Theodore Morris
Attorney, Agent, or Firm—Sidney B. Ring; Hyman F. Glass

[57] ABSTRACT

This invention relates to polyvalent metal salts of oxidized and amidified non-benzenoid hydrocarbon waxes, and to uses thereof, particularly in carbon paper inks.

21 Claims, No Drawings

POLYVALENT METAL SALTS OF OXIDIZED AND AMIDIFIED WAXES

In a carbon paper ink formulation, the hard wax is an important component because essential characteristics of the ink are imparted by the wax. A carbon ink wax should exhibit good dye solubility, pigment dispersing ability, and contribute to the hardness and oil/dye retention of the finished ink. Also, the wax should produce a low viscosity ink (Newtonian, no thixotropy) at the temperature of application. A wax must be able to produce the desired ink properties when used in a relatively small concentration. This is especially true in the production of a one-time carbon paper ink, since the concentration of the high melting wax in the formulation is usually from 8 to 12 percent.

Waxes which are currently used in carbon ink production are: (1) natural waxes, such as carnauba, ouricury and Montan wax, (2) modified microcrystalline and synthetic waxes, such as those described in U.S. Pat. No. 2,890,124, dated Oct. 1, 1956, U.S. Pat. No. 2,890,125, dated Oct. 1, 1956, and U.S. Pat. No. 3,163,548, dated May 22, 1961. These waxes are relatively expensive, consequently there is a need for more economical waxes suitable for use in carbon ink formulations, and especially for waxes with good pigment dispersion properties when used in small concentrations. U.S. Pat. No. 3,994,737 describes a process for preparing relatively economical carbon ink waxes by treating oxidized non-benzenoid waxes with polyvalent metals.

We have now discovered that the polyvalent metal salts, as described in U.S. Pat. No. 3,994,737, are unexpectedly improved by reacting the oxidized wax with ammonia or an amine prior to reacting with a polyvalent metal. The difference between this process and that described in U.S. Pat. No. 3,994,737 is that the oxidized wax is amidified prior to the polyvalent metal reaction, whereas, the oxidized wax is reacted with a polyvalent metal in U.S. Pat. No. 3,994,737. Waxes produced according to the present invention exhibit superior carbon paper ink properties to that of comparable polyvalent metal salts of oxidized waxes. In accordance with this invention, an oxidized hydrocarbon wax is amidified with ammonia or an amine, then reacted with a polyvalent metal such as those of Periodic Table Groups II, IIIA, and IV. Preferably, the polyvalent metal is an oxide or hydroxide of a divalent metal from Group IIA of the Periodic Table, or with an oxide or hydroxide of a monovalent metal from Group IA, followed by a base exchange with a di or multivalent metal such as those of Groups II, IIIA, and IV.

Oxidized hydrocarbons which are suitable for the purpose of this invention are petroleum waxes (microcrystalline and paraffin), synthetic waxes such as Polywax-650, Fischer-Tropsch wax, alpha-olefins, and certain polyethylenes and polypropylenes. Suitable waxes have melting points of 120° F. to 230° F. prior to oxidation.

The preferred types of oxidized hydrocarbons are the hard waxes such as microcrystalline wax, $C_{30+}$ alpha-olefin fraction, Polywax-650, and Fischer-Tropsch wax with melting points within the range of 160° F. to 220° F. prior to oxidation.

Petroleum waxes which are suitable for the purpose of this invention are tank bottom derived microcrystalline wax, plastic microcrystalline wax, and paraffin wax. The preferred types are the tank bottom derived microcrystalline wax with a melting point within the range of 175° F. to 200° F., and the plastic microcrystalline wax with a melting point between 165° and 175° F. Paraffin wax may be used, but more favorable results are obtained if the wax is blended with higher molecular weight material.

The alpha olefin waxes employed in this invention are of the following idealized formula $$RCH=CH_2$$

where R is alkyl, for example, having from about 4 to 50 or more carbons.

Also included within the term alpha olefin are those which are prepared by polymerizing olefins such as ethylene in the presence of Ziegler type catalysts.

Illustrative of these types of alpha olefins are those sold by Gulf, for example:

(1) Gulf Alpha Olefin Fraction $C_{20}$–$C_{24}$ which contains the following typical carbon distribution:

| | |
|---|---|
| $C_{16}$ | 1 wgt. % |
| $C_{20}$ | 49 |
| $C_{22}$ | 42 |
| $C_{24}$ | 8 |
| $C_{26}$ | 0.1 |

(2) Gulf Alpha Olefin Fraction $C_{24}$–$C_{28}$ which contains the following typical carbon distribution:

| | |
|---|---|
| $C_{22}$ | 0.3 wgt. % |
| $C_{24}$ | 28 |
| $C_{26}$ | 44 |
| $C_{28}$ | 20 |
| $C_{30+}$ | 8 |

(3) Gulf Alpha Olefin Fraction $C_{30+}$ which contains the following typical distribution:

| | |
|---|---|
| $C_{28}$ and lower | 22 wgt. % |
| $C_{30}$ and higher | 78. |

Other alpha olefins can also be employed individually, in combination, or as components of commercial raw materials.

The preferred fraction is the $C_{30+}$ alpha-olefin fraction. Lower molecular weight fractions can be used, however, it is advantageous to blend these with higher molecular weight wax and/or polyethylene.

The alpha-olefins of this invention are preferably those prepared by the addition of Aluminum-Carbon groups to the C=C bond as illustrated by the addition to ethylene. It is essentially a stepwise organo-metallic synthesis. It is illustrated by the following equations where the aluminum trialkyl is triethyl aluminum.

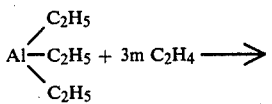

$C_2H_4$ = ethylene

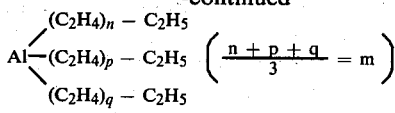

or more simply $$R = Al + m\ C_2H_4 \rightarrow R(C_2H_4)_m\ Al$$

The polyolefin is then recovered. Colloidal nickel assists in the alkylation displacement steps.

This process is described in "Polymerization and Polycondensate Processes," Advances in Chemistry, Series No. 34 (American Chemical Society 1962) pages 145-156, and Organo-Metallic Chemistry, Zeiss (Reinhold 1960) pages 200-231.

This invention will be illustrated with the following commercial mixture of alpha-olefins prepared by stepwise addition of ethylene to organo-metallics, such as triethyl aluminum, in the presence of colloidal nickel. It is known as the $C_{30+}$ Alpha Olefin Fraction and is sold by Gulf Oil Company and has the properties shown in the following Table, which properties are set forth in the Gulf Oil July 21, 1967 Gulf Oil data sheet.

TABLE I

| GULF OIL CO. $C_{30+}$ ALPHA OLEFIN FRACTION | | |
|---|---|---|
| PRODUCT CHARACTERISTICS | TYPICAL VALUE | SALES SPECIFICATION |
| Carbon No. Distribution, Gulf 1030: Wt. % | | |
| $C_{28}$ and lower | 22 max. | 28 |
| $C_{30}$ and higher | 78 min. | 72 |
| Appearance: at 175°-185° F. | Passes | Clear and bright |
| Color, Saybolt | +2 min. | 0 |
| Viscosity, SUV: Sec. at 210° F. | 52.4 max. | 59.2 |
| Viscosity, Kin: Cs. at 210° F. | 8.0 max. | 10.0 |
| Flash, COC: °F. | 510 | — |
| Melting Point, $D^a.127:°F$. | 180 max. | 195 |

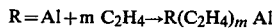

TYPICAL VALUES
Composition:
    Carbon Number Distribution by GLC: wt. %

| | |
|---|---|
| $C_{28}$ and Below | 23.2 |
| $C_{30}$ | 18.2 |
| $C_{32}$ | 15.0 |
| $C_{34}$ | 11.8 |
| $C_{36}$ | 9.0 |
| $C_{38}$ | 7.1 |
| $C_{40}$ | 5.5 |
| $C_{42}$ | 4.2 |
| $C_{44}$ | 3.1 |
| $C_{46}$ | 2.0 |
| $C_{48}$ and above | 1.0 |

Olefin-Type Distribution by Infrared Spectroscopy: mol %

| | |
|---|---|
| Saturates | 1.4 |
| Normal Alpha Olefins | 67.5 |
| Vinylidene Olefins | 25.4 |
| Internal Olefins | 5.7 |

TYPICAL PROPERTIES

| | |
|---|---|
| Blocking Point, D 1465: °F. | 115 |
| Color, Saybolt, D156 | +15 |
| Congealing Point, D 938: °F. | 169 |
| FDA Ultraviolet Absorption (extraction procedure): | |
| 280-289 mu | 0.02 |
| 290-299 mu | 0.02 |
| 300-359 mu | 0.02 |
| 360-400 mu | 0.01 |
| Melting Point, D 127: °F. | 181.5 |
| Odor, D1833 | 3.5 |
| Penetration, D1321 | 16 |
| Scaling Strength, D 2005: gm./in. | |
| at a deposition of 2.5 gm./sq. ft. | 19.6 |
| at a deposition of 3.0 gm./sq. ft. | 22.0 |

TABLE I-continued

| | |
|---|---|
| Specific Gravity, D70: 77°/77° F. | 0.8667 |
| Tensile Strength, D 1320: lsb./sq. in. | 205 |
| Viscosity, D 2161: SUS at 210° F. | 58.2 |

Synthetic hydrocarbon waxes which are applicable in this invention are the intermediate molecular weight polymers derived from the polymerization, copolymerization, and telomerization of ethylene or olefins and products of the Fischer-Tropsch synthesis of hydrocarbons from carbon monoxide and hydrogen mixtures. The higher molecular weight polywaxes can be blended with lower molecular weight waxes and other hydrocarbons, such as wax oils, for use in this invention. Two commercially available products typifying the above groups are Polywax-650 and Paraflint wax. Polywax-650 with a melting point of approximately 210° F. and Paraflint wax, a Fischer-Tropsch wax with 220° F. melting point, are desirable products for this invention.

Polyethylenes of this invention are the various polymers derived from the polymerization of ethylene such as described in U.S. Pat. No. 2,504,400, dated Apr. 18, 1950, U.S. Pat. No. 2,699,457, dated Jan. 11, 1955, Phillips Petroleum Company's Belgian Pat. No. 530,617, dated July 22, 1954, and Kirk-Othmer, Encyclopedia of Chemical Technology, Volume 10, pp 938-957. Lower molecular weight polyethylenes may be used, but the higher molecular weight polymers, because of their higher viscosity, are best blended with other waxes. Polypropylenes, polybutylenes, and other olefin polymers and copolymers may also be used in wax blends for the purpose of this invention.

The art of oxidizing inert hydrocarbon waxes such as those described is well known and has been extensively described in the literature. The preferred type of oxidation for the purpose of this invention is air oxidation with or without oxidation catalyst at temperatures ranging from 240° to +320° F. A wax or blend may be modified prior to or after the oxidation by processes such as solvent extraction, polymerization, and cracking. Depending on the susceptibility of the precursor to air oxidation, catalysts, such as soluble or insoluble organic salts, may be used in concentrations of 0.2 percent to approximately 2 percent. The preferred oxidation catalysts are cobalt, manganese, and zinc soaps, such as the naphthenates, octoates, oleates, and stearates. Oxidation time or degree of oxidation is dependent on the type of product desired.

The degree of oxidation of the hydrocarbon wax may vary from about 10 to 60 acid number and a saponification number of about 20 to 150, but preferably from about 10 to 30 acid number (20-80 saponification number). Products with greater acid numbers may be used but for reasons of economy the lower acid number products are preferred.

Amidification of the oxidized wax is accomplished by reacting the oxidized wax with ammonia at 220° F. to +320° F., but preferably from 280° F. to 320° F. Organic amines can also be employed.

These include any amine whose resultant amide contains active hydrogen, such as monoamines of the formula

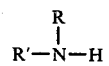

where R is a substituted group which may or may not contain an active hydrogen and R' is hydrogen or a substituted group which contains an active hydrogen. Examples of R include methyl, ethyl, propyl, butyl, amyl, hexyl, etc., including both straight and branched chain compounds of the $C_nH_{2n+1}$-series; aryl groups, such as phenyl, etc.; hydroxy containing group of this series, i.e., $HOC_nH_{2n}$—; polyalkylene ether alcohol groups, i.e. $H(OC_nH_{2n})_x$—, etc. Examples of R' include $HOC_nH_{2n}$—, $H(OC_nH_{2n})_x$—, etc.

Examples of polyamines include the polyalkylene polyamines, for example of the formula

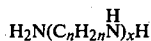

where x is an integer, for example, 1–4 or greater; the alkylated derivatives thereof; the oxyalkylated derivatives thereof; the oxyalkylated alkylated derivatives thereof, aryl polyamine for example phenylene diamine, etc. with the proviso that the above polyamines are amidifiable and that the amidified product contains active hydrogen. The active hydrogen in the amidified products should be capable of reacting with an isocyanate. For economical reasons and for superior products, ammonia is the preferred emidifying agent.

In practice, the amidification reaction is conducted at atmospheric pressure with gaseous ammonia. Ammonia is introduced at a rate of 0.0044 g/hr./g wax and reacted at 280°–320° F. for one to four hours, then the excess ammonia is removed by stripping with air or an inert gas. Reaction time is dependent on, among other factors, reaction temperature, acid and saponification number of the oxidized wax. The nitrogen content of the amidified product may vary from approximately 0.05 percent to 1.0 percent or greater, but preferably from about 0.1 percent to 0.3 percent.

Any suitable polyvalent metal can be reacted with the oxidized and amidified wax, for example those of the following groups of the Periodic Table: IIA, IIB, IIIA, IVA and IVB. For example, an oxidized and amidified wax is reacted with the oxide or hydroxide of a divalent metal of Group IIA of the Periodic Table, or with an oxide or hydroxide of a metal from Group IA followed by a base exchange with a di or multivalent metal such as those of Groups II, IIIA, and IV. Concentration of the metal may vary from approximately the acid number equivalent to approximately the saponification number equivalent of the oxidized wax.

The nature of the product is dependent on the degree of oxidation, and the concentration of the reactants. Products may be modified by varying the degree of the oxidation and the concentration of the reactants. The degree of oxidation may vary from approximately ten acid number to thirty acid number. Higher acid number products may be used, but for reasons of economy, the lower acid number products are preferred. Nitrogen content of the amidified wax may vary from about 0.05 percent to about 1.0 percent, but preferably 0.1 percent to 0.3 percent. The concentration of the base may vary from approximately the acid number equivalent to approximately the saponification number equivalent of the oxidized wax, however, with high acid number waxes, the concentration of the base may have to be decreased to compensate for the increase in viscosity.

Following are examples which describe the process more specifically and illustrate various applications of the process.

EXAMPLE 1

A $C_{30+}$ alpha olefin fraction (melting point specification, 165° to 195° F.) is charged to an oxidizer and heated to 265° F. Air is admitted through a sparger at a rate of 4 cc/minute/g wax, and the wax is oxidized without catalyst to 13.9 acid number (43.0 saponification number), and 145 SUS, 210° F., viscosity. Air is discontinued and the temperature is increased to 310° F. Ammonia is admitted at a rate of 0.0044 g/hr./g wax, and the material is ammoniated at 310° F. for three hours. The oxidized and amidified wax is transferred to a reactor equipped with a stirrer, and the temperature is adjusted to 205°–210° F. Water (0.5% by weight) and 3.5% of calcium hydroxide are added and reacted under reflux at 240° F. for two hours. Vacuum is applied and the reaction continued for one hour.

EXAMPLE 2

A $C_{30+}$ alpha olefin fraction as described in Example 1 is oxidized to 18.7 acid number (54.6 saponification number) and 159 SUS, 210° F., viscosity, then amidified and reacted with 0.5% of water, and 3.5% of calcium hydroxide according to the procedure as described in Example 1.

EXAMPLE 3

The $C_{30+}$ alpha olefin fraction of Example 1 is oxidized to 16.1 acid number (50.2 saponification number) and 185 SUS, 210° F., viscosity, then amidified, and reacted with 0.5% of water and 3.0% calcium hydroxide as previously described.

EXAMPLE 4

Example 3 is repeated with the alpha olefins of Example 1 oxidized to 16.0 acid number (48.4 saponification number) and 196 SUS, 210° F., viscosity.

EXAMPLE 5

The alpha olefins of Example 1 are oxidized to 13.7 acid number (47.8 saponification number), and 190 SUS, 210° F., viscosity in accordance with the procedure described in Example 1. The oxidized wax is reacted with 1.0% of monoethanolamine at 210°–215° F. for four hours, then the amidified product is reacted with 0.5% water and 3.0% of calcium hydroxide as previously described.

EXAMPLE 6

A blend consisting of 50% C-700 wax (a microcrystalline wax with a melting point of 196° F.) and 50% Polywax-650 (a synthetic wax, 210° F. melting point) is charged to an oxidizer, and air is admitted through a sparger at a rate of 4 cc/minute/g wax. Cobalt naphthenate (0.2% by weight) is added, temperature is adjusted to 290°–300° F., and the wax is oxidized to 24.6 acid number (66.7 saponification number) and 143 SUS, 210° F., viscosity. The oxidized wax is then amidified and reacted with 2.5% of calcium hydroxide according to the procedure described in Example 1.

EXAMPLE 7

Example 6 is repeated using 3.0% of calcium hydroxide.

Carbon ink properties of a wax are determined by testing the wax in a medium intensity black ink as described in the following procedure.

| Carbon Ink Formula | | |
|---|---|---|
| Materials | Parts by Weight | |
| Wax of this invention | 4.0 | 6.0 |
| Paraffin, 142° F.M.P. | 38.0 | 36.0 |
| Carbon Black, SRF-S | 25.0 | 25.0 |
| Mineral Oil, 100 SUS | 33.0 | 33.0 |

A mixture consisting of the wax and paraffin is heated in an oven at 220°–230° F. for two hours, then charged to a steel ballmill and milled at 220°–230° F. for five minutes. A mixture comprising the carbon black and mineral oil which was previously heated to 220°–230° F. is added and milled at 220°–230° F. for 30 minutes. The ink is sampled in a glass jar (13.5 cm×5.5 cm diameter) for viscosity determinations, and another sample is obtained in an aluminum weighing dish (2 cm×6 cm diameter) for an oil-retention penetration (ORP).

Viscosity values for the ink are determined at 6, 12, 30 and 60 RPM at 215° F. with a Brookfield viscometer using a No. 1 spindle. The ink sample is aged in an oven at 220° F. for 17 hours, then viscosity measurements are again determined at 6, 12, 30, and 60 RPM at 215° F.

The sample of ink in the aluminum weighing dish is aged at 77° F. for 17 hours, and the hardness of the ink is determined according to ASTM method D-1321.

As indicated by the data in the following Table, polyvalent metal salts of amidified and oxidized waxes are superior to corresponding unamidified products. Products prepared according to the procedure of this invention yielded low viscosity carbon inks with good pigment dispersion when milled at 4% and 6% wax concentrations (without other hard waxes) with other components of carbon paper inks as exemplified in the procedure described above. The inks also displayed good flow, and oil retention properties.

process, may be substituted for the calcium base, and these products may be more desirable than a product derived with calcium in certain applications.

We claim:

1. A polyvalent metal salt of an oxidized and amidified non-benzenoid hydrocarbon wax obtained by the process consisting essentially of the steps of (b) oxidizing a non-benzenoid hydrocarbon wax (a), (c) thereafter amidifying the oxidized wax of step (b) with ammonia or an amine containing amino hydrogen and an additional isocyanate reactible active hydrogen, and finally (d) forming a polyvalent metal salt of the previously amidified product of step (c).

2. The composition of claim 1 where the polyvalent metal is a member of the following group of the Periodic Table: IIA, IIB, IIIA, IVA and IVB.

3. The composition of claim 2 where the wax is a petroleum or synthetic wax or mixtures thereof.

4. The composition of claim 3 where
   a. the wax has a melting point of about 120°–230° F. prior to oxidation;
   b. the wax has an acid number of about 10 to 60 and/or a saponification number of about 20 to 150 after oxidation;
   c. the wax contains about 0.05 to 1.0 percent nigrogen by weight after amidification.

5. The composition of claim 4 where the wax prior to oxidation has a melting point of about 160° to 220° F.

6. The composition of claim 5 where said oxidized wax has an acid number of about 10–30 and/or a saponification number of about 20–80.

7. The composition of claim 6 where the amidified wax of step (c) contains about 0.1 to 0.3 percent nitrogen by weight.

8. The composition of claim 6 where the polyvalent metal is calcium.

9. The composition of claim 8 where the wax is a

| | Wax Performance in a Black Ink Formulation | | | | | | | | | |
|---|---|---|---|---|---|---|---|---|---|---|
| Example | 4% Formula Ink Viscosity(Initial/aged)[1] | | | | | 6% Formula Ink Viscosity(Initial/aged)[1] | | | | |
| Number | 6 RPM | 12 RPM | 30 RPM | 60 RPM | ORP | 6 RPM | 12 RPM | 30 RPM | 60 RPM | ORP |
| Number 1 | 27/222 | 28/153 | 26/90 | 23/62 | 34 | — | — | — | — | — |
| Number 2[2] | 20/234 | 20/183 | 27/115 | 25/86 | 34 | — | — | — | — | — |
| Number 3[3] | 16/120 | 18/99 | 18/64 | 16/50 | 38 | — | — | — | — | — |
| Number 4 | 20/130 | 21/96 | 20/65 | 18/47 | 33 | — | — | — | — | — |
| Number 5 | — | — | — | — | — | 20/58 | 17/53 | 17/39 | 16/32 | 32 |
| Number 6[4] | — | — | — | — | — | 13/24 | 12/23 | 14/22 | 13/20 | 36 |
| Number 7 | — | — | — | — | — | 14/20 | 13/20 | 14/18 | 14/17 | 35 |

[1]Brookfield, cps at 210°–215° F.
[2]The oxidized precursor of Example 1 was processed according to the procedure of Example 1, but without amidification, and the resulting product failed in the 4% formulation. Viscosity results are as follows: 658/500, 390/331, OR/OR, over range of instrument/over range of instrument.
[3]Oxidized precursor (non-amidified) of Example 3 reacted according to the procedure of Example 3 failed to yield a satisfactory ink in a 4% formulation. Viscosity values of the 4% formulation are: 625/572, 407/396, OR/OR, over range of instrument/over range of instrument.
[4]The oxidized precursor (non-amidified wax) of Example 6 treated in accordance with the procedure described in Example No. 6 failed in a 6% formulation. Initial and aged ink viscosities of this work are as follows: 21/461, 19/307, 19/OR, 17/over instrument range.

Although the products of this invention have been characterized as carbon ink waxes, and more specifically as carbon paper ink waxes, these products are suitable for use in other inks such as news inks, flexographic ink, rotogravure ink, and screen ink. Also, the products may be used in solvent inks, protective coatings, mold release compounds, and various types of polishes such as floor polish, shoe polish, furniture polish, and car polish.

Products of the invention may be further modified by incorporating a monovalent metal, preferably potassium or lithium, for use in various polish formulations. Also, other bases and metal salts, as indicated in the microcrystalline wax, an alpha olefin wax, a Fischer-Tropsch wax, a polyethylene type wax, or mixtures thereof.

10. A carbon paper ink containing the composition of claim 1 and oil.

11. A carbon paper ink containing the composition of claim 2 and oil.

12. A carbon paper ink containing the composition of claim 3 and oil.

13. A carbon paper ink containing the composition of claim 4 and oil.

14. A carbon paper ink containing the composition of claim 5 and oil.

15. A carbon paper ink containing the composition of claim 6 and oil.

16. A carbon paper ink containing the composition of claim 7 and oil.

17. A carbon paper ink containing the composition of claim 8 and oil.

18. A carbon paper ink containing the composition of claim 9 and oil.

19. The composition of claim 9 where the amidifying agent is ammonia.

20. A carbon paper ink containing the composition of claim 19 and oil.

21. A carbon paper ink according to claim 20 in which the oil is mineral oil.